United States Patent
Shirakawa

(10) Patent No.: US 10,234,704 B2
(45) Date of Patent: Mar. 19, 2019

(54) OPTICAL MODULE THAT INCLUDES OPTICAL MODULATOR AND BIAS CONTROL METHOD FOR OPTICAL MODULATOR

(71) Applicant: Fujitsu Optical Components Limited, Kawasaki-shi, Kanagawa (JP)

(72) Inventor: Iori Shirakawa, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 15/695,652

(22) Filed: Sep. 5, 2017

(65) Prior Publication Data
US 2018/0088359 A1    Mar. 29, 2018

(30) Foreign Application Priority Data
Sep. 29, 2016   (JP) .................. 2016-191227

(51) Int. Cl.
| | | |
|---|---|---|
| H04B 10/50 | (2013.01) | |
| G02F 1/01 | (2006.01) | |
| G02F 1/225 | (2006.01) | |
| G02F 1/21 | (2006.01) | |

(52) U.S. Cl.
CPC .......... G02F 1/0123 (2013.01); G02F 1/2257 (2013.01); H04B 10/50575 (2013.01); G02F 2001/212 (2013.01); G02F 2201/58 (2013.01)

(58) Field of Classification Search
CPC .............. H04B 10/505; H04B 10/5053; H04B 10/5057–1/50577
See application file for complete search history.

(56) References Cited

U.S. PATENT DOCUMENTS

| | | | |
|---|---|---|---|
| 2010/0080571 A1* | 4/2010 | Akiyama | G02F 1/0123 398/184 |
| 2012/0155865 A1 | 6/2012 | Kawakami et al. | |
| 2012/0288284 A1 | 11/2012 | Yoshida et al. | |
| 2016/0156416 A1 | 6/2016 | Shirakawa | |

FOREIGN PATENT DOCUMENTS

| | | |
|---|---|---|
| JP | 2007-133176 | 5/2007 |
| JP | 2013-88702 | 5/2013 |
| JP | 2016-102870 | 6/2016 |
| WO | 2011/030763 A1 | 3/2011 |
| WO | 2011/104838 A1 | 9/2011 |

OTHER PUBLICATIONS

Hiroto Kawakami et al., "Auto bias control technique for optical 16-QAM transmitter with asymmetric bias dithering", Optics Express, vol. 19, No. 26, Dec. 2011, pp. B308-B312.

* cited by examiner

Primary Examiner — Jerry Rahll

(57) ABSTRACT

An optical module includes: an optical modulator, a superimposing unit, an offset adding unit, a detector, and a bias controller. The optical modulator includes a first modulator to generate a first optical signal, a second modulator to generate a second optical signal and a phase shifter to provide a specified phase difference between the first optical signal and the second optical signal so as to generate a modulated optical signal. The superimposing unit superimposes a low frequency signal on a DC bias of the first modulator. The offset adding unit adds an offset to a DC bias of the second modulator. The detector detects a low frequency component from output light of the optical modulator. The bias controller controls a DC bias that is applied to the phase shifter based on the low frequency component detected by the detector.

5 Claims, 8 Drawing Sheets

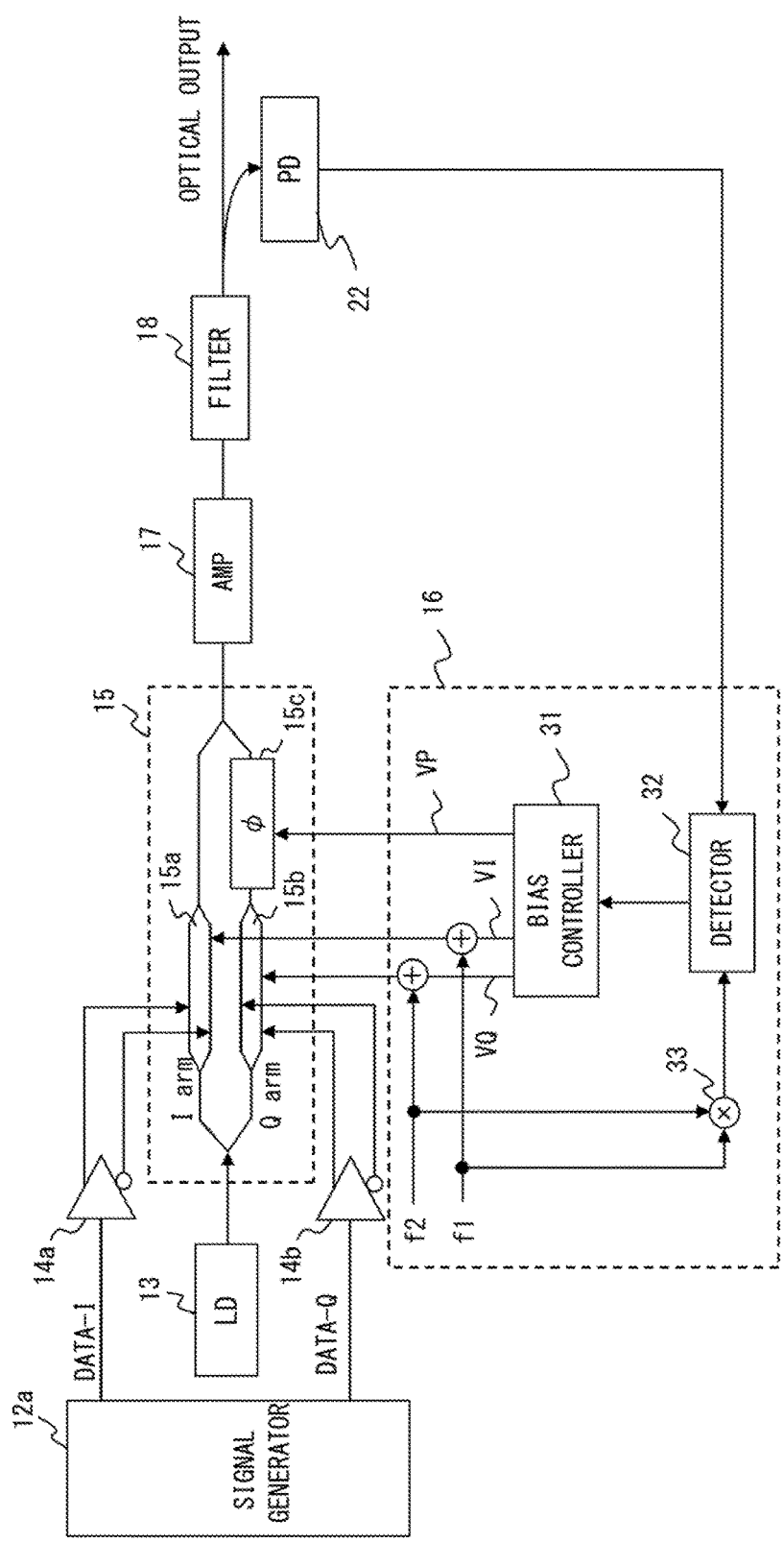
F I G. 2

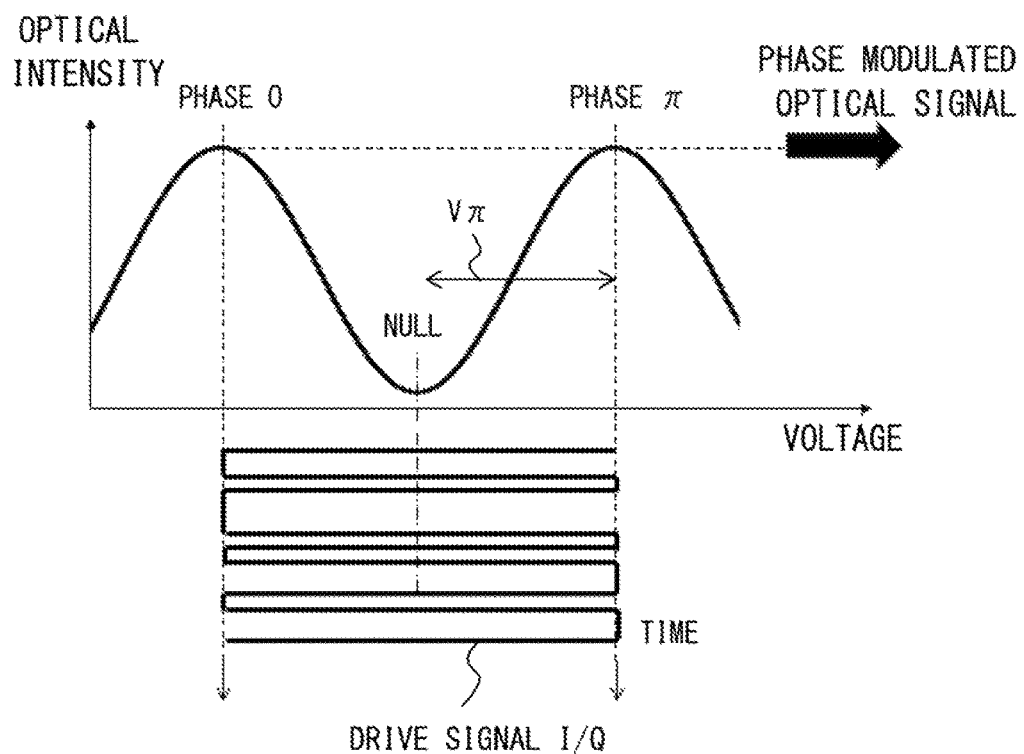
F I G. 3

OPTICAL MODULE THAT INCLUDES OPTICAL MODULATOR AND BIAS CONTROL METHOD FOR OPTICAL MODULATOR

CROSS-REFERENCE TO RELATED APPLICATION

This application is based upon and claims the benefit of priority of the prior Japanese Patent Application No. 2016-191227, filed on Sep. 29, 2016, the entire contents of which are incorporated herein by reference.

FIELD

The embodiments discussed herein are related to an optical module that includes an optical modulator and a method for controlling a DC bias of the optical modulator.

BACKGROUND

For high-speed optical communications of 10 Gbps or greater, an optical modulator that includes Mach-Zehnder modulators is often used. The optical modulator includes two Mach-Zehnder modulators (an I-arm Mach-Zehnder modulator and a Q-arm Mach-Zehnder modulator). Each Mach-Zehnder modulator generates an optical signal (an I-arm optical signal and a Q-arm optical signal) based on a drive signal. The optical modulator includes a phase shifter to provide a phase difference of $\pi/2$ between the I-arm optical signal and the Q-arm optical signal. The optical modulator generates a modulated optical signal by combining the I-arm optical signal and the Q-arm optical signal.

To generate a high-quality modulated optical signal, the phase difference generated by the phase shifter needs to be accurately controlled to be $\pi/2$. Accordingly, methods have been proposed for control of a phase difference generated by a phase shifter. For example, in dithering-based feedback control, low frequency signals are respectively given to an I arm and a Q arm. Then, a DC bias voltage applied to a phase shifter is controlled according to a low frequency signal component contained in output light of an optical modulator. Such feedback control is described by, for example, Japanese Laid-open Patent Publication No. 2007-133176, International Publication Pamphlet No. WO2011/104838 (Japanese Patent No. 5318278), and International Publication Pamphlet No. WO2011/030763 (Japanese Patent No. 5261779).

In many cases, an optical module that includes an optical transceiver with digital coherent technique is required to transmit and receive an optical signal in a desired wavelength channel. In this case, the optical module includes a wavelength-tunable light source to generate continuous wave light of a specified wavelength. When data is transmitted under a modulating scheme in which the number of bits per symbol is large, the optical intensity of a transmission signal may be decreased due to a modulation loss. Meanwhile, narrowing the bandwidth of each wavelength channel so as to enhance the efficiency of frequency utilization may decrease the optical intensity of the transmission signal. Accordingly, a modulated optical signal generated by an optical modulator is amplified by an optical amplifier. However, amplifying an optical signal using an optical amplifier also amplifies noise, and this could degrade an optical SNR (Signal-to-Noise Ratio). Accordingly, an optical module includes a wavelength tunable filter to transmit or receive a specified wavelength channel.

The wavelength of a wavelength tunable light source is controlled through dithering. In addition, the center wavelength of a passband of the wavelength tunable filter is also controlled through dithering. That is, the bias of the optical modulator, the wavelength of the wavelength tunable light source, and the center wavelength of the passband of the wavelength tunable filter are all controlled using a low frequency signal. In addition, in the prior arts (e.g., the configurations described in the patent documents described above), a plurality of low frequency signals with different frequencies are used to control the bias of the phase shifter of an optical modulator.

However, to control those signals in parallel, the frequencies of the individual low frequency signals need to be different from each other. Hence, in a configuration in which only a limited frequency band can be used for control in an optical module, it is preferable that few frequencies be used to control the DC bias of the phase shifter of an optical modulator.

SUMMARY

According to an aspect of the present invention, an optical module includes: a light source configured to generate continuous wave light; an optical modulator that includes a first modulator that modulates the continuous wave light so as to generate a first optical signal, a second modulator that modulates the continuous wave light so as to generate a second optical signal, and a phase shifter that provides a specified phase difference between the first optical signal and the second optical signal, the optical modulator being configured to combine the first and second optical signals between which the phase difference is provided so as to generate a modulated optical signal; a superimposing unit configured to superimpose a low frequency signal on a DC bias of the first modulator; an offset adding unit configured to add an offset to a DC bias of the second modulator; a detector configured to detect a low frequency component corresponding to the low frequency signal from output light of the optical modulator; and a bias controller configured to control a DC bias that is applied to the phase shifter based on the low frequency component detected by the detector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of bias control of an optical modulator;

FIG. 3 illustrates an operating point of an optical modulator;

DESCRIPTION OF EMBODIMENTS

Figure 1:
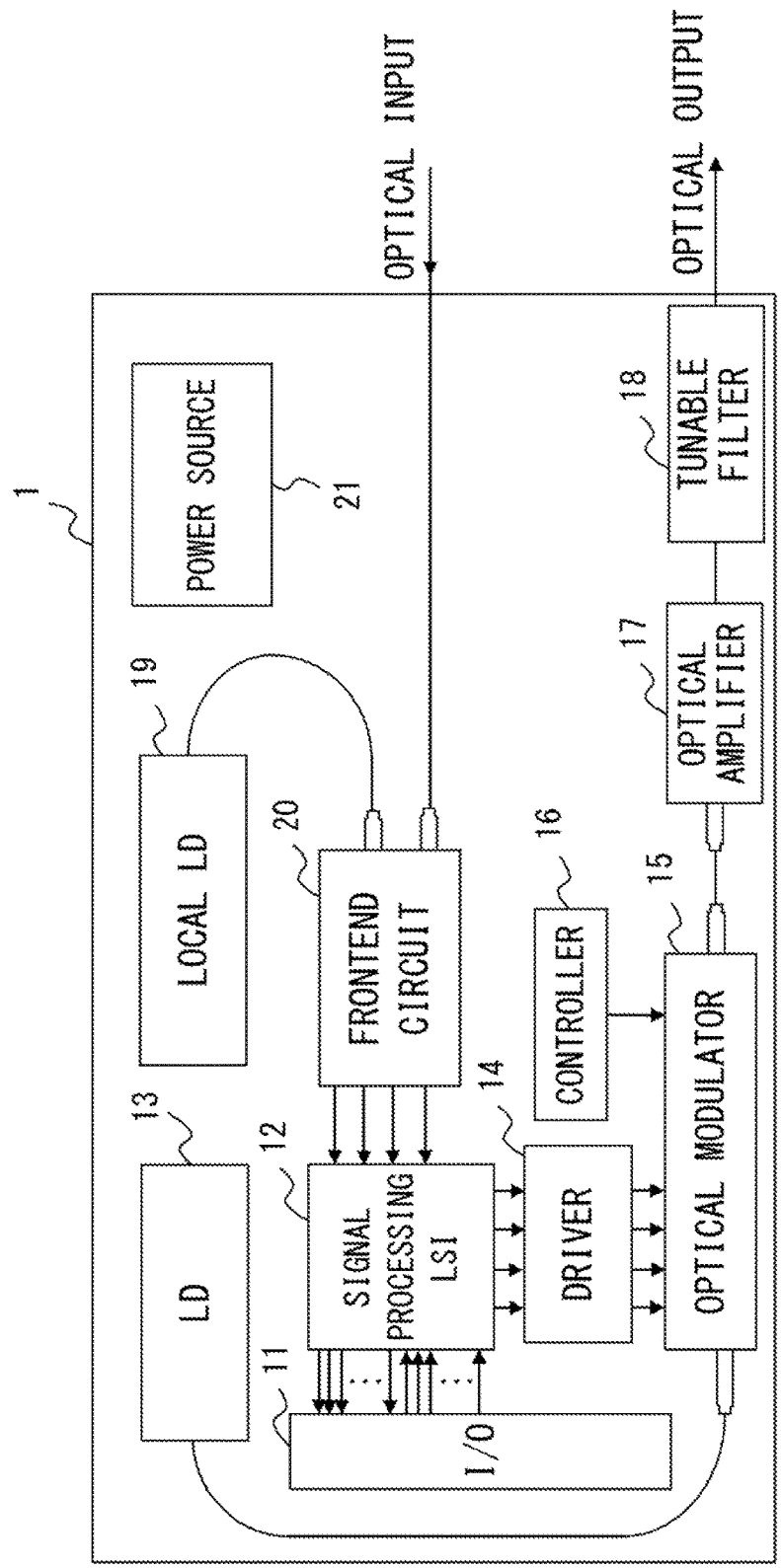
FIG. 1 illustrates an example of an optical module.

FIG. 1 illustrates an example of an optical module in accordance with an embodiment of the present invention. An optical module 1 in accordance with the embodiment includes a function to generate a modulated optical signal from transmission data and output the generated signal, and a function to receive a modulated optical signal to recover data. That is, the optical module 1 is equipped with an optical transceiver.

The optical module 1 includes an I/O connector 11, a signal processing LSI 12, a transmitter light source 13, a modulator driver 14, an optical modulator 15, a controller 16, an optical amplifier 17, a wavelength tunable filter 18, a local light source 19, a receiver frontend circuit 20, and a power source 21. The optical module 1 may include another circuit or element that is not depicted in FIG. 1.

The I/O connector 11 connects a circuit external to the optical module 1 to a circuit equipped on the optical module 1. That is, transmission data is guided to the signal processing LSI 12 via the I/O connector 11. Received data recovered by the signal processing LSI 12 is output via the I/O connector 11.

The signal processing LSI 12 generates a transmission symbol sequence from transmission data in accordance with a specified modulation scheme. The transmission symbol sequence is represented by I-component data and Q-component data. In addition, the signal processing LSI 12 recovers received data by demodulating an output signal of the receiver frontend circuit 20.

The transmitter light source 13 is implemented by, for example, a wavelength tunable laser. The transmitter light source 13 generates continuous wave light with a frequency according to a channel selection instruction. That is, the wavelength of the continuous wave light corresponds to the carrier wavelength of a modulated optical signal output from the optical module 1. In this example, the wavelength of the transmitter light source 13 is controlled by dithering in which a low frequency signal is used.

The modulator driver 14 generates a pair of drive signals (a drive signal I and a drive signal Q) from I-component data and Q-component data generated by the signal processing LSI 12. The optical modulator 15 generates a modulated optical signal by modulating the continuous wave light output from the transmitter light source 13 using the drive signal I and the drive signal Q. That is, in this example, the optical modulator 15 is operated as an I/Q modulator. The optical modulator 15 is implemented by, for example, an LN modulator formed on an LiNbO3 substrate. Alternatively, the optical modulator 15 may be implemented by a semiconductor optical modulator based on InP or silicon photonics. The configuration and operation of the optical modulator 15 will be described in detail below.

The controller 16 controls the operating state of the optical modulator 15. For example, the controller 16 may control a DC bias voltage of the optical modulator 15. The controller 16 may control the operation of another circuit or element equipped on the optical module 1.

The optical amplifier 17 amplifies a modulated optical signal generated by the optical modulator 15. The optical amplifier 17 is implemented by, for example, a semiconductor optical amplifier (SCA) or an erbium-doped fiber amplifier (EDFA). The wavelength tunable filter 18 filters the output light of the optical amplifier 17 using a passband that corresponds to a channel selection instruction. In this example, the center wavelength of the passband of the wavelength tunable filter 18 is controlled through dithering in which a low frequency signal is used.

The local light source 19 is implemented by, for example, a wavelength tunable laser. The local light source 19 generates continuous wave light with a wavelength according to a channel selection instruction. In this example, the wavelength of the local light source 19 is also controlled through dithering in which a low frequency signal is used. The receiver frontend circuit 20 generates an electric field information signal that indicates a received optical signal by coherent detection using the continuous wave light output from the local light source 19. The power source 21 supplies power to circuits and elements equipped on the optical module 1.

As described above, the optical module 1 may generate a modulated optical signal from transmission data and output the generated signal. In addition, the optical module 1 may recover data from a received optical signal. That is, the optical module 1 is equipped with an optical transceiver.

FIG. 2 illustrates an example of bias control of the optical modulator 15. In this example, the optical modulator 15 is a Mach-Zehnder modulator that includes an I-arm modulator 15a, a Q-arm modulator 15b, and a phase shifter 15c. Each of the I-arm modulator 15a and the Q-arm modulator 15b is implemented by a Mach-Zehnder modulator.

A signal generator 12a generates I-component data and Q-component data from transmission data in accordance with a specified modulation scheme. The signal generator 12a may be equipped within the signal processing LSI 12 depicted in FIG. 1. A driver 14a generates a drive signal I from I-component data. A driver 14b generates a drive signal Q from Q-component data. In this example, the drive signal I and the drive signal Q are respectively difference signals. The driver 14a and the driver 14b form the driver 14 depicted in FIG. 1.

Continuous wave light output from the transmitter light source 13 is split and guided to the I-arm modulator 15a and the Q-arm modulator 15b. The I-arm modulator 15a generates an optical signal I by modulating the continuous wave light using the drive signal I. The Q-arm modulator 15b generates an optical signal Q by modulating the continuous wave light using the drive signal Q.

The phase shifter 15c provides a specified phase difference between the optical signal I and the optical signal Q by adjusting the phase of at least one of the optical signal I or the optical signal Q. In this example, the specified phase difference is $\pi/2$. $\pi/2$ hereinafter means $\pi/2+n\pi$ (n is an arbitrary integer including zero). The phase shifter 15c is implemented by, for example, an electrode formed in the vicinity of an optical waveguide in the optical modulator 15. In this case, the refractive index (i.e., optical path length) of the optical guide provided in the vicinity of the phase shifter 15c changes with respect to a DC bias voltage applied to the phase shifter 15c. That is, the phase of the optical signal is adjusted in accordance with the DC bias voltage applied to the phase shifter 15c.

In the example depicted in FIG. 2, the phase shifter 15c is provided on an output side of the Q-arm modulator 15b and adjusts the phase of an optical signal Q generated by the Q-arm modulator 15b. However, the phase shifter 15c may be provided at another position. For example, the phase shifter 15c may be provided for the I arm and adjust the phase of an optical signal I generated by the I-arm modulator 15a. Meanwhile, the phase shifter 15c may be provided at an input side of the I-arm modulator 15a or the Q-arm modulator 15b and adjust the phase of the continuous wave light before modulation.

The optical modulator 15 generates a modulated optical signal by combining the optical signals I and Q between which the phase difference is provided. This modulated optical signal is output via the optical amplifier 17 and the wavelength tunable filter 18.

A photo detector 22 converts output light of the optical modulator 15 or output light of the wavelength tunable filter 18 into an electric signal. The photo detector 22 may be configured to include a photodiode. The electric signal generated by the photo detector 22 is used by the controller 16, which controls the bias of the optical modulator 15. For the bias control of the optical modulator 15, it does not matter whether the wavelength tunable filter 18 is provided on the output side of the optical modulator 15. Accordingly, the "output light of the optical modulator 15" may hereinafter indicate "output light of the optical modulator 15 or the wavelength tunable filter 18".

In the example depicted in FIG. 2, the controller 16 includes a bias voltage controller 31, a synchronous detector 32, and a mixer 33. The bias controller 31 controls the respective operating points of the I-arm modulator 15a and the Q-arm modulator 15b. The operating point of the I-arm modulator 15a is controlled by a DC bias voltage VI, and the operating point of the Q-arm modulator 15b is controlled by a DC bias voltage VQ. In phase modulation such as QPSK or QAM, the operating point of each modulator is controlled such that the center of a drive signal matches a null point of an optical intensity curve with respect to applied voltage, as illustrated in FIG. 3. Methods for controlling the operating point of an optical modulator for phase modulation are described by, for example, Japanese Laid-open Patent Publication No. 2013-88702, Japanese Laid-open Patent Publication No. 2016-102870, and Hiroto Kawakami et al., Auto bias control technique for optical 16-QAM transmitter with asymmetric bias dithering, OPTICS EXPRESS, Vol. 19, NO. 26, pp. B308-B312, December 2011.

The bias voltage controller 31 controls a DC bias voltage VP applied to the phase shifter 15c, so as to make a phase difference of $\pi/2$ between an optical signal I and an optical signal Q. In this situation, in the example depicted in FIG. 2, a low frequency signal f1 is superimposed on the DC bias voltage VI, and a low frequency signal f2 is superimposed on a DC bias voltage VQ. The frequencies of the low frequency signals f1 and f2 are sufficiently low in comparison with the data rate. The frequencies of the low frequency signals f1 and f2 are different from each other.

In this situation, the output light of the I-arm modulator 15a contains a frequency component f1, and the output light of the Q-arm modulator 15b contains a frequency component f2. Accordingly, the output light of the optical modulator 15 contains a frequency component f1±f2 (that is f1+f2 and f1−f2) in addition to the frequency components f1 and f2. The photo detector 22 converts the output light of the optical modulator 15 (the output light of the wavelength tunable filter 18 in FIG. 2) into an electric signal. Accordingly, the electric signal generated by the photo detector 22 contains a frequency component f1±f2 in addition to the frequency components f1 and f2. An electric signal generated by the photo detector 22 may hereinafter be referred to as a monitoring signal.

In this example, the synchronous detector 32 detects the frequency component f1±f2 from the output light of the optical modulator 15. Accordingly, the mixer 33 generates a reference signal of a frequency f1+f2 based on the low frequency signals f1 and f2. The synchronous detector 32 detects a frequency component f1+f2 from the monitoring signal by using the reference signal.

The bias voltage controller 31 controls the DC bias voltage VP so as to minimize the frequency component f1+f2. As a result, the phase difference between the optical signal I and the optical signal Q is adjusted to be $\pi/2$.

As described above, the phase difference between the optical signal I and the optical signal Q is adjusted and made to be $\pi/2$ through the dithering control in which the low frequency signals f1 and f2 are used. However, in the configuration illustrated in FIG. 2, three frequencies (f1, f2, and f1+f2) are used to adjust the phase shift amount of the phase shifter 15c.

In the optical module 1, not only the dithering for controlling the phase shifter 15c of the optical modulator 15 but also the dithering for adjusting other various circuits or elements is performed. For example, the wavelength of the transmitter light source 13 may be controlled through dithering. The center frequency of the passband of the wavelength tunable filter 18 may also be controlled through dithering. The frequencies of low frequency signals used in these types of dithering control (they may hereinafter be referred to as "dithering frequency") need to be different from each other. Hence, in a configuration in which only a limited frequency band can be used to control circuits or elements of the optical module 1, it is preferable that few dithering frequencies be used to control the DC bias voltage of the phase shifter 15c.

Note that if the dithering for control of the wavelength of the transmitter light source 13 and the dithering for control of the bias of the optical modulator 15 are performed in time division multiplexing, the same dithering frequency can be used for them. In many cases, however, it is not easy to perform the dithering of the transmitter light source 13 and the dithering of the optical modulator 15 in time division multiplexing. When, for example, the transmitter light source 13 includes a dedicated dithering circuit to control a wavelength, it is difficult to synchronize the dithering of the transmitter light source 13 and the dithering of the optical modulator 15. In addition, when the transmitter light source 13 and the optical modulator 15 are produced by different vendors, it is also difficult to synchronize the dithering of the transmitter light source 13 and the dithering of the optical modulator 15. Thus, it is preferable that fewer number of dithering frequencies be used to control the DC bias voltage of the phase shifter 15c.

EMBODIMENTS

Figure 4:
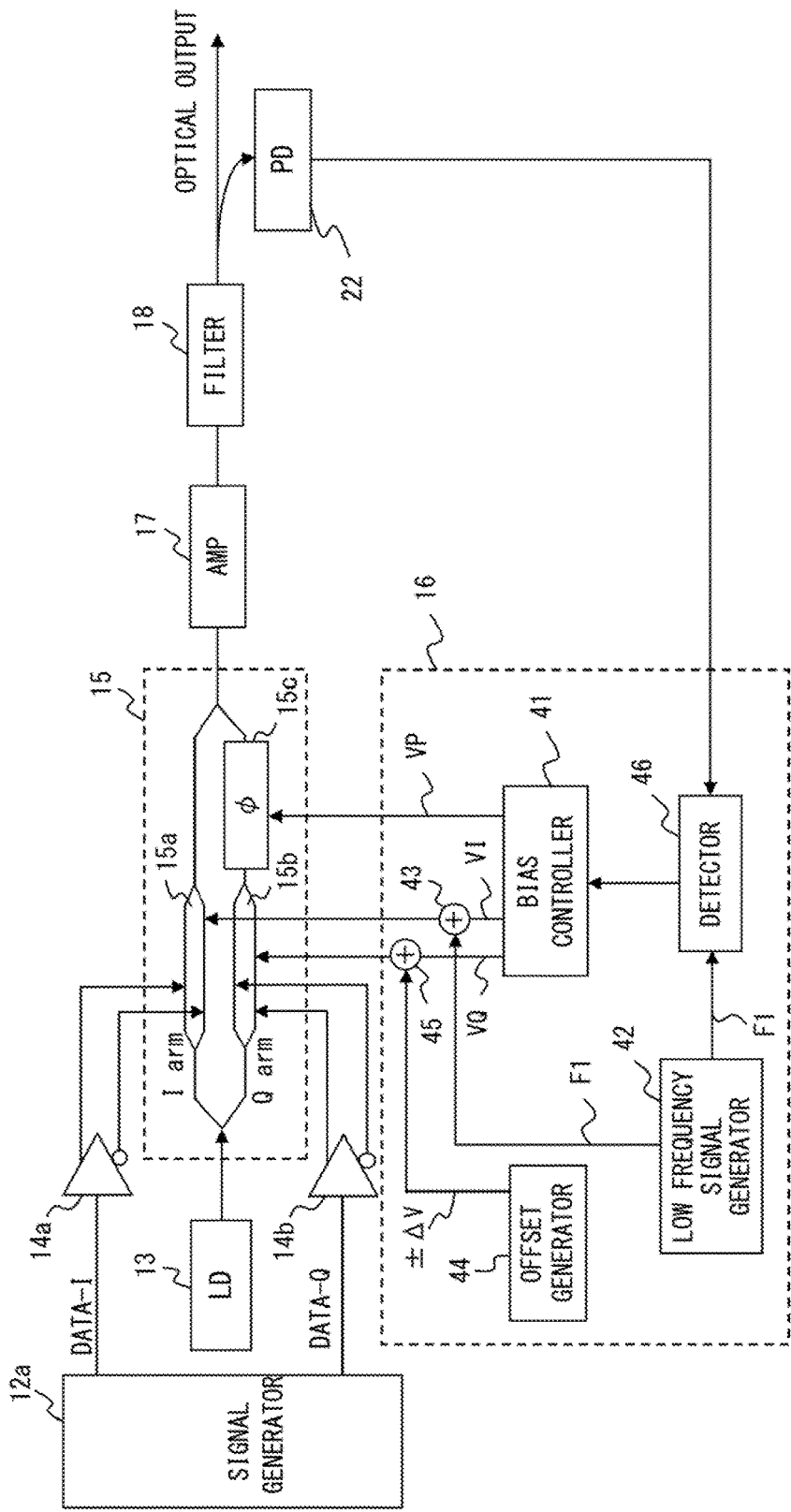
FIG. 4 illustrates an exemplary configuration for controlling a DC bias of a phase shifter.

FIG. 4 illustrates an exemplary configuration for controlling a DC bias of the phase shifter 15c. The signal generator 12a, the transmitter light source 13, the drivers 14a and 14b, the optical modulator 15, the optical amplifier 17, the wavelength tunable filter 18, and the photo detector 22 in FIG. 4 are substantially the same as those in FIG. 2.

Continuous wave light generated by the transmitter light source 13 is guided to the I-arm modulator 15a and the Q-arm modulator 15b. The I-arm modulator 15a generates an optical signal I by modulating the continuous wave light using a drive signal I. Similarly, the Q-arm modulator 15b generates an optical signal Q by modulating the continuous wave light using a drive signal Q. The phase shifter 15c provides a specified phase difference between the optical signal I and the optical signal Q. The optical modulator 15 generates a modulated optical signal by combining the optical signal I and the optical signal Q. The photo detector 22 generates a monitoring signal by converting the output light of the optical modulator 15 into an electric signal.

The controller 16 includes a bias voltage controller 41, a low frequency signal generator 42, an adder 43, an offset generator 44, an adder 45, and a synchronous detector 46. The controller 16 may include another function that is not depicted in FIG. 4.

As in the example depicted in FIG. 2, the bias voltage controller 41 controls the respective operating points of the I-arm modulator 15a and the Q-arm modulator 15b. The operating points of the I-arm modulator 15a and the Q-arm modulator 15b are respectively optimized by controlling a DC bias voltage VI and a DC bias voltage VQ using a known method.

The low frequency signal generator 42 and the offset generator 44 are activated when the controller 16 controls the DC bias voltage VP of the phase shifter 15c. The bias voltage controller 41 controls the DC bias voltage VP of the phase shifter 15c by performing feedback control using the output light of the optical modulator 15.

Figure 5A:
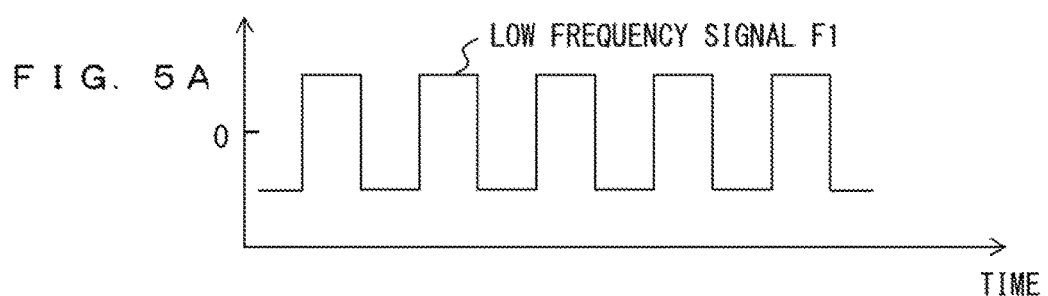
FIGS. 5A-5D illustrate an example of signals generated by a controller.

The low frequency signal generator 42 generates a low frequency single F1 of a specified frequency. The frequency of the low frequency signal F1 is specified in a frequency range of, for example, several Hz to hundreds kHz. The low frequency signal F1 oscillates with zero as the center, as depicted in FIG. 5A. Note that when an amplitude of the low frequency signal F1 is too large, the quality of the modulated optical signal generated by the optical modulator 15 is degraded. On the other hand, when the amplitude of the low frequency signal F1 is too small, the sensitivity of detection of the frequency component of the low frequency signal F1 decreases. Hence, the amplitude of the low frequency signal F1 is preferably determined in consideration of these factors. The waveform of the low frequency signal F1 is rectangular-shaped in the example depicted in FIG. 5A, but the invention is not limited to this. For example, the waveform of the low frequency signal F1 may be a sine wave.

Figure 5B:
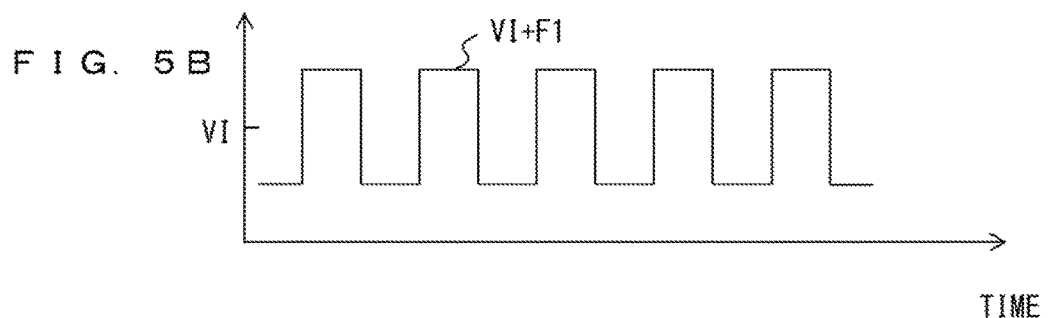

The adder 43 adds the low frequency signal F1 to the DC bias signal VI calculated by the bias voltage controller 41. Accordingly, the output signal of the adder 43 oscillates with VI as the center, as depicted in FIG. 5B. The DC bias signal VI on which the low frequency signal F1 is superimposed is converted into a voltage signal and applied to the I-arm modulator 15a. In this way, the low frequency signal generator 42 and the adder 43 are operated as a superimposing unit that superimposes a low frequency signal on a DC bias.

Figure 5C:
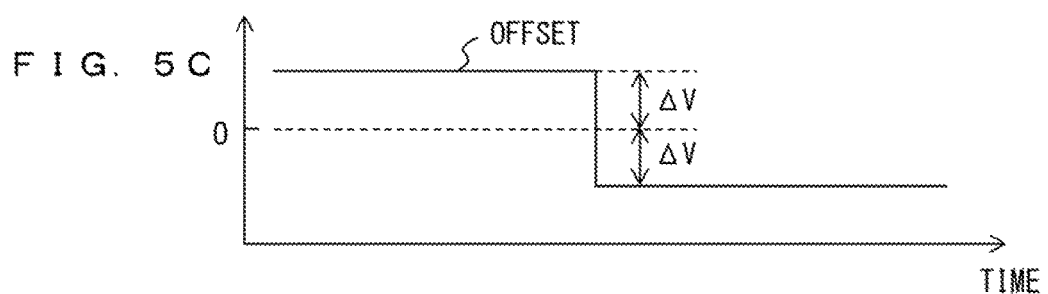

The offset generator 44 may selectively generate two specified offsets (a positive offset and a negative offset). The absolute values of the two offsets are equal. In particular, the offset generator 44 outputs a positive offset (+ΔV) or a negative offset (−ΔV), as depicted in FIG. 5C, in accordance with an instruction from the bias voltage controller 41.

Figure 5D:
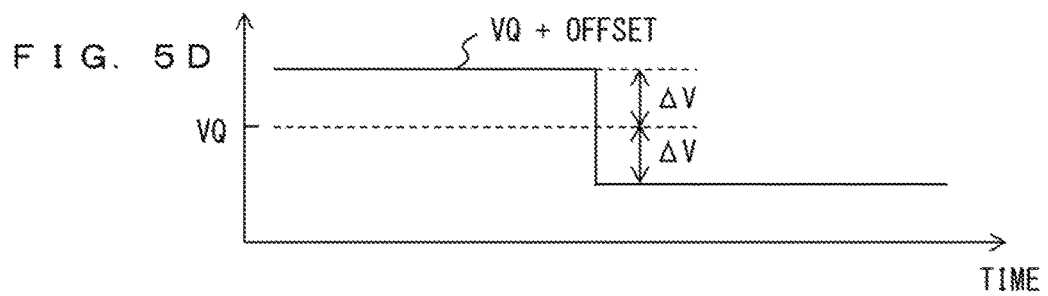

The adder 45 adds an offset to the DC bias signal VQ calculated by the bias voltage controller 41. Hence, the output signal of the adder 45 is "VQ+ΔV" or "VQ−ΔV", as depicted in FIG. 5D. In particular, the output signal of the adder 45 is "VQ+ΔV" when the offset generator 44 generates a positive offset. Meanwhile, the output signal of the adder 45 is "VQ−ΔV" when the offset generator 44 generates a negative offset. The DC bias signal VQ to which the offset is added is converted into a voltage signal and applied to the Q-arm modulator 15b. In this way, the offset generator 44 and the adder 45 are operated as an offset adding unit that adds a positive offset or a negative offset to a DC bias.

In the example illustrated in FIG. 4, a low frequency signal is superimposed on the DC bias signal of the I-arm modulator 15a, and an offset is added to the DC bias signal of the Q-arm modulator 15b; however, the invention is not limited to this configuration. In particular, the controller 16 may superimpose a low frequency signal on the DC bias signal of the Q-arm modulator 15b and add an offset to the DC bias signal of the I-arm modulator 15a.

As described above, when the controller 16 controls the DC bias voltage VP of the phase shifter 15c, the low frequency signal F1 is superimposed on the DC bias voltage VI. Hence, the output light of the optical modulator 15 contains a frequency component that corresponds to the low frequency signal F1. That is, the monitoring signal generated by the photo detector 22 contains a frequency component that corresponds to the low frequency signal F1. A frequency component that corresponds to the low frequency signal F1 may hereinafter be referred to as a "low frequency component F1".

The synchronous detector 46 detects the low frequency component F1 from the monitoring signal using the low frequency signal F1 generated by the low frequency signal generator 42. That is, the low frequency component F1 contained in the output light of the optical modulator 15 is detected by the synchronous detector 46.

According to the low frequency component F1 detected by the synchronous detector 46, the bias voltage controller 41 controls the DC bias voltage VP applied to the phase shifter 15c. In this situation, the bias voltage controller 41 controls the DC bias voltage VP according to the low frequency component F1 detected when the positive offset is added to the DC bias voltage VQ, and the low frequency component F1 detected when the negative offset is added to the DC bias voltage VQ.

The controller 16 may be implemented by a processor system that includes a processor and a memory. In this case, the processor may execute a program to control the optical modulator 15. The monitoring signal output from the photo detector 22 is converted into a digital signal by an A/D converter (not illustrated) and fed to the controller 16. The output signal of the controller 16 (e.g., a signal that indicates a DC bias to control the operation of the optical modulator 15 and so on) is converted into an analog signal by a D/A converter (not illustrated). Alternatively, the controller 16 may be implemented by a digital signal processing circuit. Moreover, the controller 16 may be implemented by an analog circuit. In this case, nether the A/D converter nor the D/A converter described above is needed.

Figure 6:
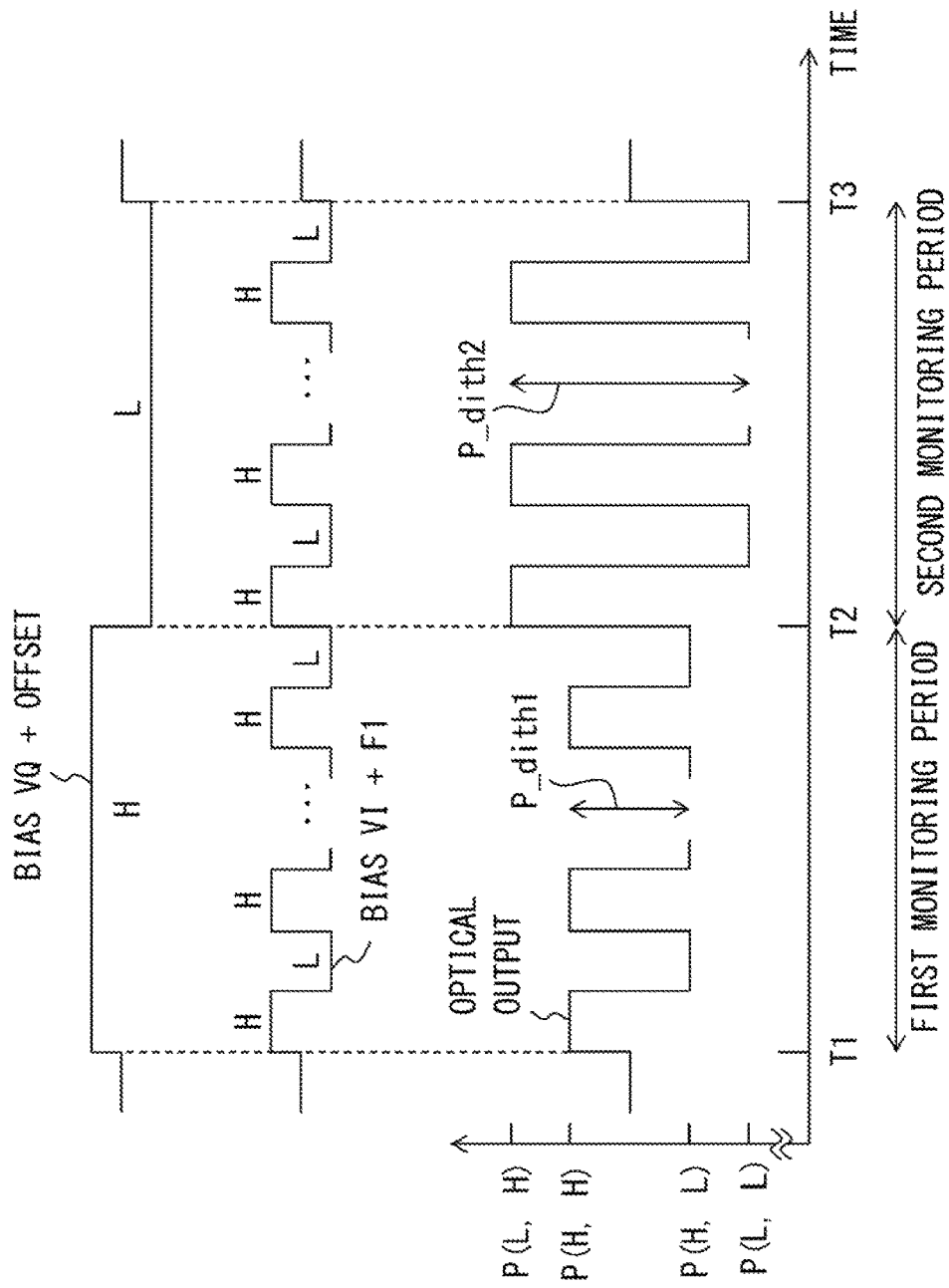
FIG. 6 illustrates an example of a bias and output light of an optical modulator.

FIG. 6 illustrates an example of a bias and output light of the optical modulator 15. In the example depicted in FIG. 6, the offset generator 44 generates a positive offset in a first monitoring period (T1-T2) and generates a negative offset in a second monitoring period (T2-T3). The low frequency signal generator 42 generates a low frequency signal F1 in the first and second monitoring periods.

In the first monitoring period, the DC bias voltage VQ to which the positive offset added (i.e., VQ+ΔV) is applied to the Q-arm modulator 15b. The DC bias voltage VI on which the low frequency signal F1 is superimposed is applied to the I-arm modulator 15a. Hence, the output light of the optical modulator 15 contains the low frequency component F1. In this case, the intensity (or amplitude) of the low frequency component F1 detected from the output light of the optical modulator 15 is P_dith1.

In the second monitoring period, the DC bias voltage VQ to which the negative offset added (i.e., VQ−ΔV) is applied to the Q-arm modulator 15b. The DC bias voltage VI on which the low frequency signal F1 is superimposed is applied to the I-arm modulator 15a, as in the case of the first monitoring period. Hence, the output light of the optical modulator 15 contains the low frequency component F1, as in the case of the first monitoring period. In this case, however, the intensity (or amplitude) of the low frequency component F1 detected from the output light of the optical modulator 15 is P_dith2. In the example depicted in FIG. 6, P_dith2, which is detected in the second monitoring period, is greater than P_dith1, which is detected in the first monitoring period; however, depending on the state of the optical modulator 15, P_dith2 may be smaller than P_dith1, or may be substantially equal to P_dith1.

Using the synchronous detector 46, the bias voltage controller 41 detects the intensities P_dith1 and P_dith2 of the low frequency component F1 contained in the output light of the optical modulator 15. In addition, the bias voltage controller 41 generates an error signal that represents a difference between P_dith1 and P_dith2.

Figure 7:
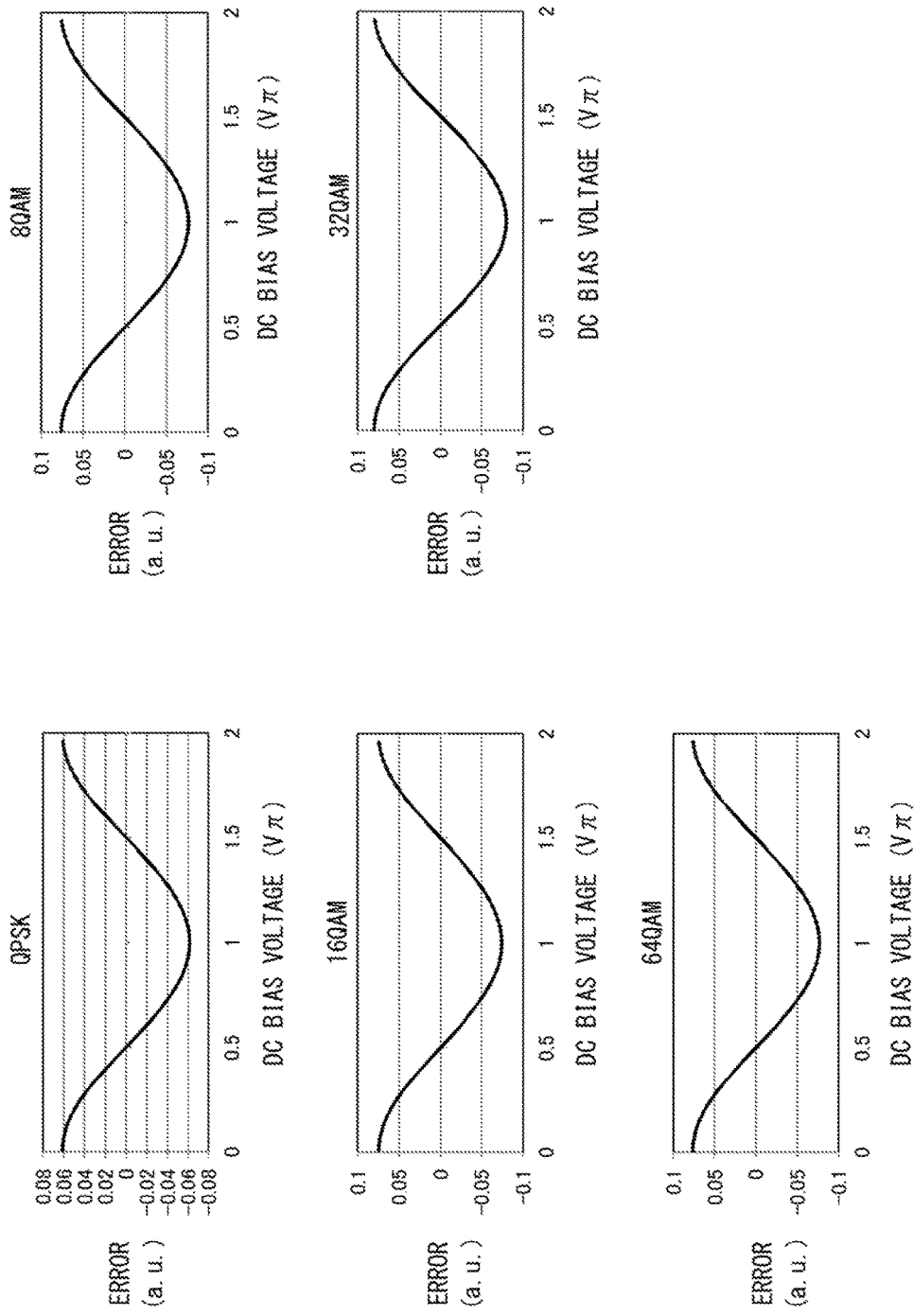
FIG. 7 illustrates error signals with respect to a DC bias voltage applied to a phase shifter.

FIG. 7 illustrates error signals with respect to a DC bias voltage applied to the phase shifter 15c. A DC bias voltage normalized by a half wavelength voltage Vπ of the optical modulator 15 is indicated on the abscissa of the graph. In FIG. 7, "DC bias voltage=zero" indicates that the phase difference between optical signals I and Q is zero, and "DC bias voltage=1" indicates that the phase shifter 15c provides a phase difference of n between optical signals I and Q. An error signal is indicated in an arbitrary unit on the ordinate of the graph. Each graph depicted in FIG. 7 indicates a relationship between a DC bias voltage and an error signal in the case of transmitting data in QPSK, 8QAM, 16QAM, 32QAM, or 64QAM.

As illustrated in FIG. 7, the error signal is periodically changed with respect to a DC bias voltage applied to the phase shifter 15c. In particular, the absolute value of the error signal is maximized at "DC bias voltage=zero, 1, or 2". The error signal is zero at "the DC bias voltage=0.5 or 1.5". "DC bias voltage=0.5" corresponds to a state in which the phase shifter 15c provides a phase difference of π/2 between optical signals I and Q. "DC bias voltage=1.5" corresponds to a state in which the phase shifter 15c provides a phase difference of 3π/2 between optical signals I and Q. In other words, when the DC bias voltage of the phase shifter 15c is controlled so as to decrease the error signal, the phase difference provided between the optical signals I and Q approach π/2 (or 3π/2). This characteristic does not depend on the modulation scheme, as depicted in FIG. 7.

Figure 8:
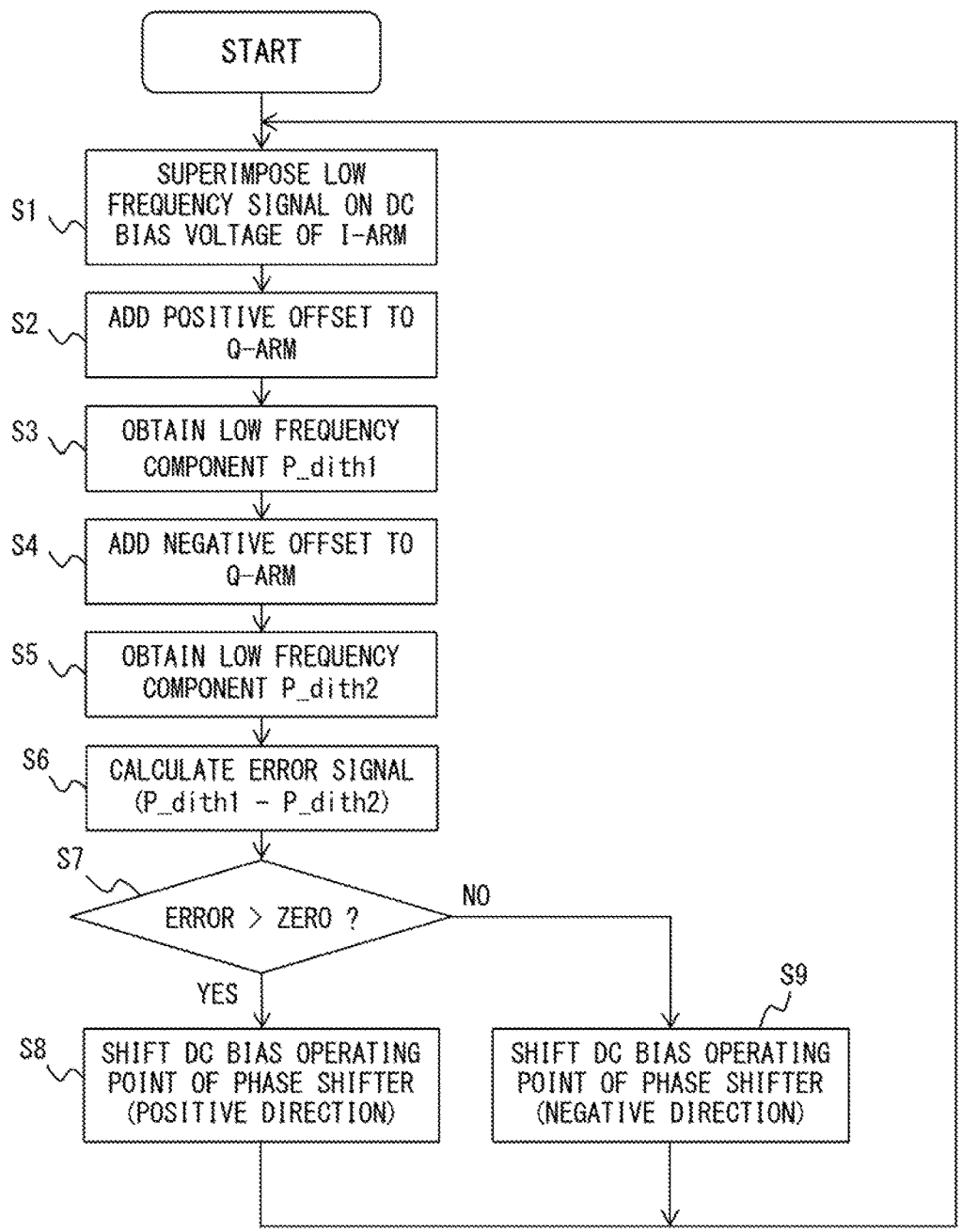
FIG. 8 is a flowchart illustrating an exemplary method for controlling a DC bias voltage of a phase shifter.

FIG. 8 is a flowchart illustrating an exemplary method for controlling a DC bias voltage of the phase shifter 15c. For example, the process of this flowchart may be periodically performed by the controller 16.

In S1, the controller 16 superimposes a low frequency signal F1 on a DC bias voltage VI of the I-arm modulator 15a. That is, the controller 16 activates the low frequency signal generator 42. The adder 43 adds the low frequency signal F1 to the DC bias signal VI. The output signal of the adder 43 is converted into a voltage signal and applied to the I-arm modulator 15a. As a result, the DC bias voltage VI on which the low frequency signal F1 is superimposed is applied to the I-arm modulator 15a.

In S2, the controller 16 adds a positive offset to a DC bias voltage VQ of the Q-arm modulator 15b. In particular, the controller 16 causes the offset generator 44 to generate a positive offset. The adder 45 adds the positive offset to the DC bias signal VQ. The output signal of the adder 45 is converted into a voltage signal and applied to the Q-arm modulator 15b. As a result, the DC bias voltage VQ to which the positive offset is added (i.e., VQ+ΔV) is applied to the Q-arm modulator 15b.

In S3, the controller 16 obtains an intensity P_dith1 of a low frequency component F1 when VQ+ΔV is applied to the Q-arm modulator 15b. In particular, the output light of the optical modulator 15 is converted into an electric signal by the photo detector 22. Using the synchronous detector 46, the bias voltage controller 41 obtains the intensity P_dith1 of the low frequency component F1 from the electric signal. In the example depicted in FIG. 6, P_dith1 corresponds to the difference between intensity P (H, H) and intensity P (H, L), which are detected in the first monitoring period, i.e., the period from T1 to T2. P_dith1 has a sign. In this example, P_dith1 is a positive value when P (H, H) is higher than P (H, L), and is a negative value when P (H, H) is lower than P (H, L). P (H, H) represents the intensity of the low frequency component F1 detected when a positive offset is added to the DC bias voltage VQ and the low frequency signal F1 is at an H level. P (H, L) represents the intensity of the low frequency component F1 detected when a positive offset is added to the DC bias voltage VQ and the low frequency signal F1 is at an L level. The bias voltage controller 41 may measure P (H, H) and P (H, L) a plurality of times during the first monitoring period and calculate P_dith1 according to the average of the measured values.

In S4, the controller 16 adds a negative offset to the DC bias voltage VQ of the Q-arm modulator 15b. In particular, the controller 16 causes the offset generator 44 to generate a negative offset. The adder 45 adds the negative offset to a DC bias signal VQ. The output signal of the adder 45 is converted into a voltage signal and applied to the Q-arm modulator 15b. As a result, the DC bias voltage VQ to which the negative offset added (i.e., VQ−ΔV) is applied to the Q-arm modulator 15b.

In S5, the controller 16 obtains an intensity P_dith2 of the low frequency component F1 when VQ−ΔV is applied to the Q-arm modulator 15b. In the example depicted in FIG. 6, P_dith2 corresponds to the difference between intensity P (L, H) and intensity P (L, L), which are detected in the second monitoring period, i.e., the period from T2 to T3. P_dith2 has a sign. In this example, P_dith2 is a positive value when P (L, H) is higher than P (L, L), and is a negative value when P (L, H) is lower than P (L, L). P (L, H) represents the intensity of the low frequency component F1 detected when a negative offset is added to the DC bias voltage VQ and the low frequency signal F1 is at the H level. P (L, L) represents the intensity of the low frequency component F1 detected when a negative offset is added to the DC bias voltage VQ and the low frequency signal F1 is at the L level. The bias voltage controller 41 may measure P (L, H) and P (L, L) a plurality of times during the second monitoring period and calculate P_dith2 according to the average of the measured values.

In S6, the controller 16 generates an error signal by calculating the difference between the P_dith1 calculated in S3 and the P_dith2 calculated in S5. In this example, an error signal E is calculated in accordance with the following formula.

$$E = P\_dith1 - P\_dith2$$

The sign of the error signal indicates whether the current phase shift amount of the phase shifter 15c is greater than a target value. In the example depicted in FIG. 7, a positive error signal indicates that the phase of the phase shifter 15c is smaller than π/2, and a negative error signal indicates that the phase of the phase shifter 15c is greater than π/2. Accordingly, the controller 16 can decide according to the sign of the error signal whether to increase or decrease the phase of the phase shifter 15c.

In S7, the controller 16 decides whether the error signal is greater than zero. When the error signal is greater than zero (i.e., P_dith1>P_dith2), the controller 16 determines that the current phase shift amount of the phase shifter 15c is smaller than the target value. In this case, the process of the controller 16 shifts to S8. In S8, the controller 16 increases the DC bias voltage VP of the phase shifter 15c by a specified amount so as to shift a DC bias operating point of the phase shifter 15c in a positive direction by a specified amount.

When the error signal is smaller than zero (i.e., P_dith1<P_dith2), the controller 16 determines that the current phase shift amount of the phase shifter 15c is greater than the target value. In this case, the process of the controller 16 shifts to S9. In S9, the controller 16 decreases the DC bias voltage VP of the phase shifter 15c by a specified amount so as to shift the DC bias operating point of the phase shifter 15c in a negative direction by a specified amount.

The following describes the processes of S7-S9 by referring to the example illustrated in FIG. 7. The following description is based on the assumption that the DC bias voltage VP of the phase shifter 15c is controlled within a range of zero to 1.

When the error signal is greater than zero, the bias voltage controller 41 determines that the DC bias voltage VP of the phase shifter 15c is smaller than "0.5". In this case, the bias voltage controller 41 increases the DC bias voltage VP of the phase shifter 15c by a specified amount. As a result, the DC bias voltage VP approaches "0.5".

When the error signal is smaller than zero, the bias voltage controller 41 determines that the DC bias voltage VP of the phase shifter 15c is greater than "0.5". In this case, the bias voltage controller 41 decreases the DC bias voltage VP of the phase shifter 15c by a specified amount. As a result, the DC bias voltage VP approaches "0.5".

As described above, the DC bias voltage VP of the phase shifter 15c approaches "0.5" in accordance with the process of the flowchart depicted in FIG. 8. "DC bias voltage VP=0.5" corresponds to a state in which the phase shifter 15c provides a phase difference of π/2 between the optical signals I and Q. Accordingly, the controller 16 can optimize the operating state of the optical modulator 15 by controlling the DC bias voltage VP of the phase shifter 15c according to the error signal. Note that when the absolute value of the error signal is zero or is approximately zero, the controller 16 may maintain the DC bias voltage VP of the phase shifter 15c, i.e., not change it.

In the configuration depicted in FIG. 4, one low frequency signal F1 is used for the dithering for controlling the DC bias voltage of the phase shifter 15c. In the configuration depicted in FIG. 2, by contrast, a plurality of low frequency signals with different frequencies (at least f1 and f2) are used for the dithering for controlling the DC bias voltage of the phase shifter 15c. That is, in comparison with the configuration depicted in FIG. 2, according to the configuration depicted in FIG. 4, the number of dithering frequencies to be used for controlling the DC bias voltage of the phase shifter 15c is decreased.

The flowchart depicted in FIG. 8 is one example, and the invention is not limited to that procedure. For example, the controller 16 may perform the processes of S4-S5 prior to S2-S3. The controller 16 may perform the process of controlling the DC bias voltage of the I-arm modulator 15a, the process of controlling the DC bias voltage of the Q-arm modulator 15b, and the process of controlling the DC bias voltage of the phase shifter 15c in order repeatedly.

The following describes a relationship between an error signal and the phase of the phase shifter 15c. Let $P_{out}$, i.e., the intensity of signal light output from the optical modulator 15, be expressed by formula (1).

$$P_{out} \propto \cos^2\varphi_I + \cos^2\varphi_Q - 2\cos2\varphi_P \cdot \cos\varphi_I \cdot \cos\varphi_Q \qquad (1)$$

$$\varphi_I = \frac{\pi}{2} \times \left(\frac{V_{sig\_I}(t)}{V\pi_{RF}} + \frac{V_{bias\_I}}{V\pi_{DC}}\right)$$

$$\varphi_Q = \frac{\pi}{2} \times \left(\frac{V_{sig\_Q}(t)}{V\pi_{RF}} + \frac{V_{bias\_Q}}{V\pi_{DC}}\right)$$

$$\varphi_P = \frac{\pi}{2} \times \left(\frac{V_{bias\_P}}{V\pi_{DC}}\right)$$

$V_{sig\_I}$ (t) represents a drive signal I supplied to the I-arm modulator 15a. $V_{sig\_Q}$ (t) represents a drive signal Q supplied to the Q-arm modulator 15b. $V_{bias\_I}$ corresponds to a DC bias voltage VI for controlling the operating point of the I-arm modulator 15a. $V_{bias\_Q}$ corresponds to a DC bias voltage VQ for controlling the operating point of the Q-arm modulator 15b. $V_{bias\_P}$ corresponds to a DC bias voltage VP for controlling the phase of the phase shifter 15c. $V_{bias\_P}/V\lambda_{DC}$ corresponds to the DC bias voltage VP normalized by a half wavelength voltage Vπ (i.e., the value indicated on the abscissa of each graph in FIG. 7).

When a positive offset is added to the DC bias voltage VQ of the Q-arm modulator 15b, the intensity of the output light of the optical modulator 15 varies between P(H, H) and P(H, L), as depicted in FIG. 6. In this case, the low frequency component P_dith1 is expressed by formula (2).

$$P_{dith1} = P(H, H) - P(H, L) \qquad (2)$$

$$= \{\cos^2\varphi_{I\_H} + \cos^2\varphi_{Q\_H} - 2\cos2\varphi_P \cdot \cos\varphi_{I\_H} \cdot \cos\varphi_{Q\_H}\} -$$

$$\{\cos^2\varphi_{Q\_H} + \cos^2\varphi_{I\_L} - 2\cos2\varphi_P \cdot \cos\varphi_{Q\_H} \cdot \cos\varphi_{I\_L}\}$$

Similarly, when a negative offset is added to the DC bias voltage VQ of the Q-arm modulator 15b, the intensity of the output light of the optical modulator 15 varies between P(L, H) and P(L, L), as depicted in FIG. 6. In this case, the low frequency component P_dith2 is expressed by formula (3).

$$P_{dith2} = P(L, H) - P(L, L) \qquad (3)$$

$$= \{\cos^2\varphi_{Q\_L} + \cos^2\varphi_{I\_H} - 2\cos2\varphi_P \cdot \cos\varphi_{Q\_L} \cdot \cos\varphi_{I\_H}\} -$$

$$\{\cos^2\varphi_{I\_L} + \cos^2\varphi_{Q\_L} - 2\cos2\varphi_P \cdot \cos\varphi_{I\_L} \cdot \cos\varphi_{Q\_L}\}$$

The error signal represents the difference between a low frequency component generated when a positive offset is added to the DC bias voltage VQ and a low frequency component generated when a negative offset is added to the DC bias voltage VQ. Hence, an error signal Error is expressed by formula (4).

$$\text{Error} = P_{dith1} - P_{dith2} \qquad (4)$$

$$= -2\cos2\varphi_P\{\cos\varphi_{I\_H} \cdot \cos\varphi_{Q\_H} - \cos\varphi_{Q\_H} \cdot \cos\varphi_{I\_L} -$$

$$\cos\varphi_{Q\_L} \cdot \cos\varphi_{I\_H} + \cos\varphi_{I\_L} \cdot \cos\varphi_{Q\_L}\}$$

$$\propto \cos2\varphi_P$$

Accordingly, the error signal is proportional to cos $2\varphi_P$. Hence, when $2\varphi_P$ is π/2 or 3π/2, the error signal is zero. That is, when $\varphi_P$ is π/4 or 3π/4, the error signal is zero.

Assigning π/4 to $\varphi_P$ in formula (1) results in $V_{bias\_P}/V\pi_{DC}$=0.5. Similarly, assigning 3π/4 to $\varphi_P$ in formula (1) results in $V_{bias\_P}/V\pi_{DC}$=1.5. $V_{bias\_P}/V\pi_{DC}$ corresponds to a value indicated on the abscissa of each graph depicted in FIG. 7. Hence, when the error signal approaches zero, the phase difference generated by the phase shifter 15c approach π/2 (or 3π/2).

The configuration depicted in FIG. 4 is one example, and the invention is not limited to this. For example, the optical module 1 may generate and transmit a polarization multiplexed optical signal. In this situation, the optical module 1 includes a pair of optical modulators. The configuration of each optical modulator is substantially the same as that of the optical modulator 15 illustrated in FIG. 4. Modulated optical signals generated by the optical modulators are multiplexed by a polarization beam combiner. In this case, the controller 16 controls the DC bias voltage of the phase shifters of both of the optical modulators.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical module comprising:
   a light source configured to generate continuous wave light;
   an optical modulator that includes a first modulator that modulates the continuous wave light so as to generate a first optical signal, a second modulator that modulates the continuous wave light so as to generate a second optical signal, and a phase shifter that provides a specified phase difference between the first optical signal and the second optical signal, the optical modulator being configured to combine the first and second optical signals between which the phase difference is provided so as to generate a modulated optical signal;
   a superimposing unit configured to superimpose a low frequency signal on a DC bias of the first modulator;
   an offset adding unit configured to add an offset to a DC bias of the second modulator;
   a detector configured to detect a low frequency component corresponding to the low frequency signal from output light of the optical modulator; and
   a bias controller configured to control a DC bias that is applied to the phase shifter based on the low frequency component detected by the detector, wherein
   an operation by the superimposing unit to superimpose the low frequency signal on the DC bias of the first modulator is performed in parallel with an operation by the offset adding unit to add the offset to the DC bias of the second modulator.

2. An optical module comprising:
   a light source configured to generate continuous wave light;
   an optical modulator that includes a first modulator that modulates the continuous wave light so as to generate a first optical signal, a second modulator that modulates the continuous wave light so as to generate a second optical signal, and a phase shifter that provides a specified phase difference between the first optical signal and the second optical signal, the optical modulator being configured to combine the first and second optical signals between which the phase difference is provided so as to generate a modulated optical signal;
   a superimposing unit configured to superimpose a low frequency signal on a DC bias of the first modulator;
   an offset adding unit configured to add an offset to a DC bias of the second modulator;
   a detector configured to detect a low frequency component corresponding to the low frequency signal from output light of the optical modulator; and
   a bias controller configured to control a DC bias applied to the phase shifter according to a difference between a low frequency component detected by the detector when a positive offset is added to the DC bias of the second modulator and a low frequency component detected by the detector when a negative offset is added to the DC bias of the second modulator.

3. The optical module according to claim 2, wherein the bias controller controls the DC bias applied to the phase shifter so as to reduce the difference.

4. The optical module according to claim 2, wherein an absolute value of the positive offset is equal to an absolute value of the negative offset.

5. A bias control method for controlling a DC bias of a phase shifter in an optical modulator that includes a first modulator that modulates continuous wave light so as to generate a first optical signal, a second modulator that modulates the continuous wave light so as to generate a second optical signal, and the phase shifter, the phase shifter providing a specified phase difference between the first optical signal and the second optical signal, the optical modulator being configured to combine the first and second optical signals between which the phase difference is provided so as to generate a modulated optical signal, the bias control method comprising:
   superimposing a low frequency signal on a DC bias of the first modulator;
   obtaining a first measured value by detecting a low frequency component corresponding to the low frequency signal from output light of the optical modulator while adding a positive offset to a DC bias of the second modulator;
   obtaining a second measured value by detecting a low frequency component corresponding to the low frequency signal from the output light of the optical modulator while adding a negative offset to the DC bias of the second modulator; and
   controlling a DC bias that is applied to the phase shifter based on a difference between the first measured value and the second measured value.

\* \* \* \* \*